April 6, 1926.
J. VERBURG
1,579,741
AUTOMATIC SCALE FOR COPYING CAMERAS
Filed March 23, 1925    2 Sheets-Sheet 1
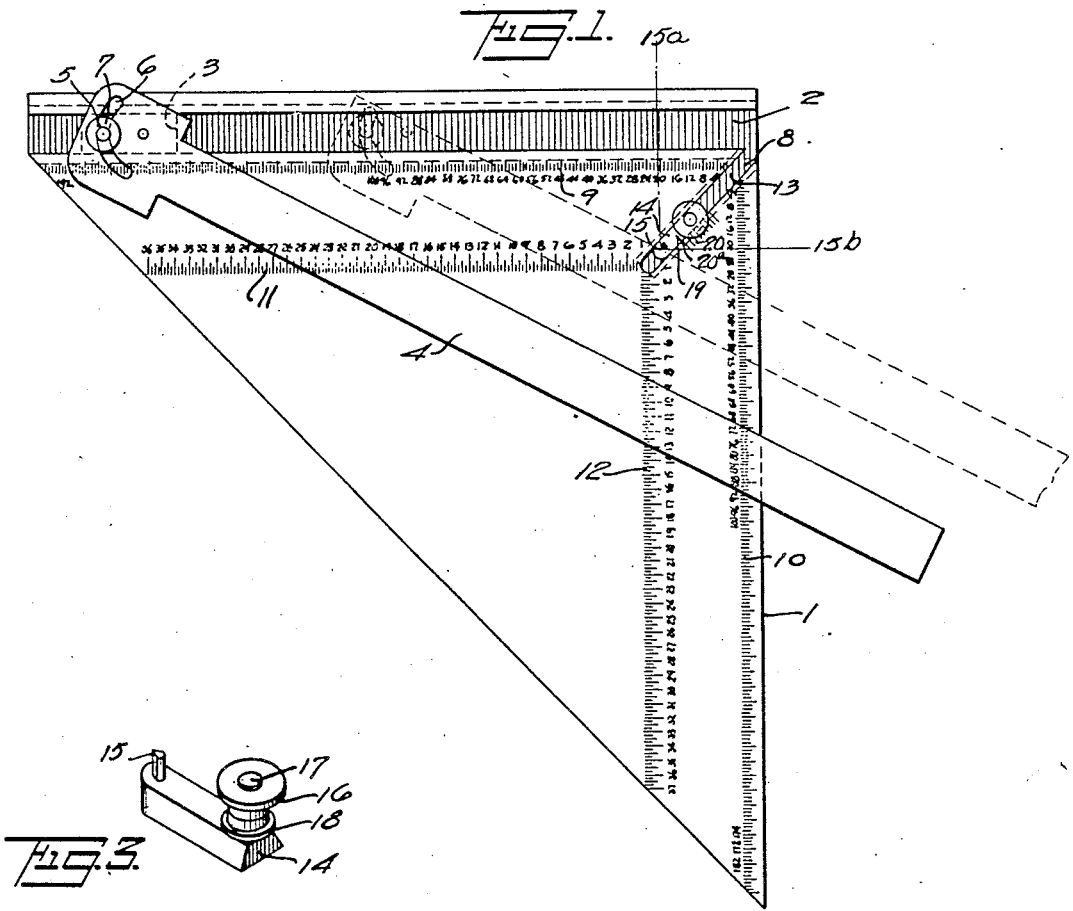
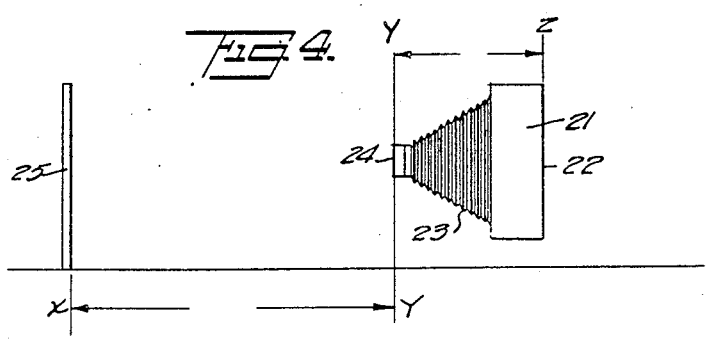
INVENTOR
John Verburg
BY
ATTORNEY April 6, 1926.  1,579,741
J. VERBURG
AUTOMATIC SCALE FOR COPYING CAMERAS
Filed March 23, 1925  2 Sheets-Sheet 2
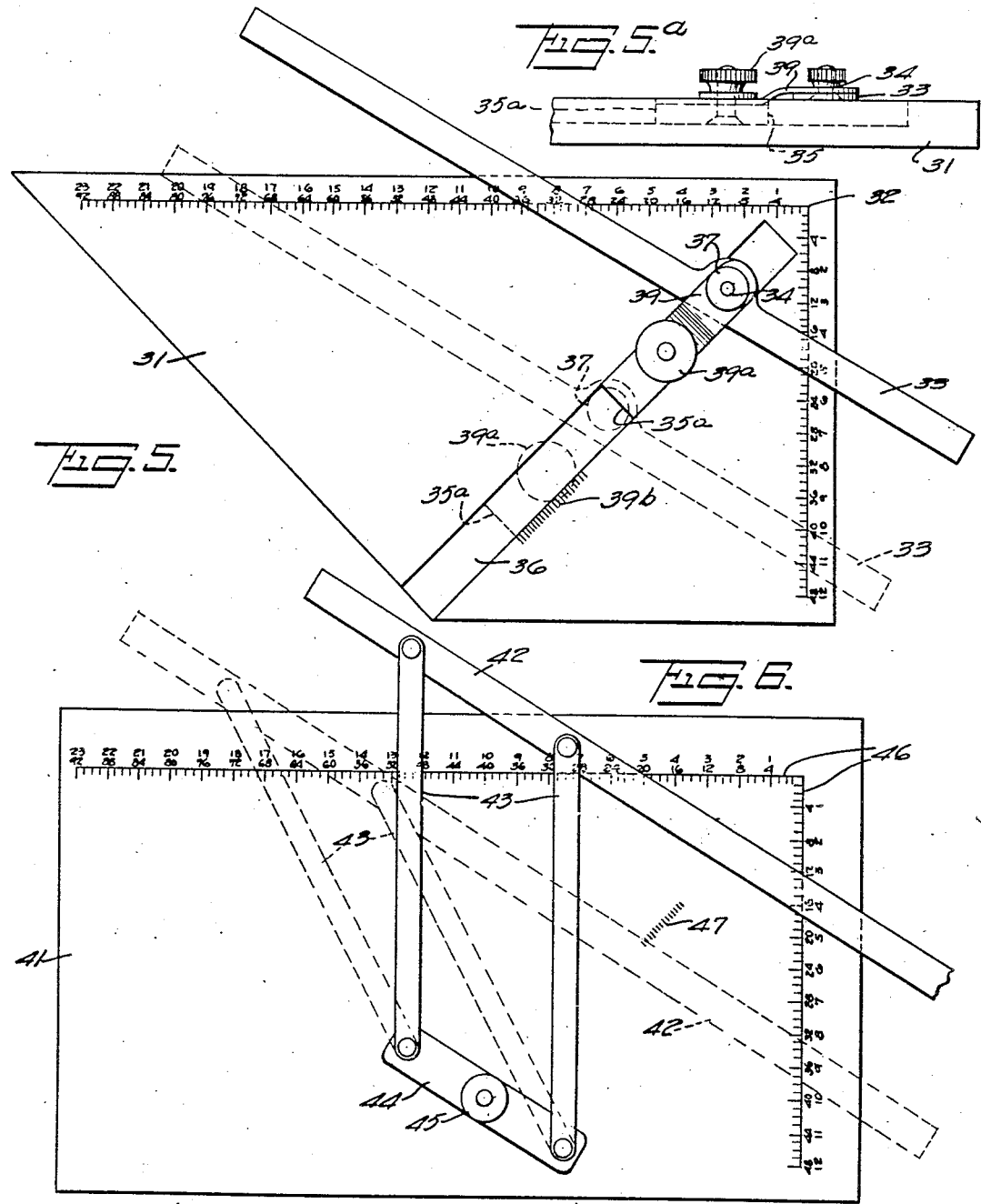
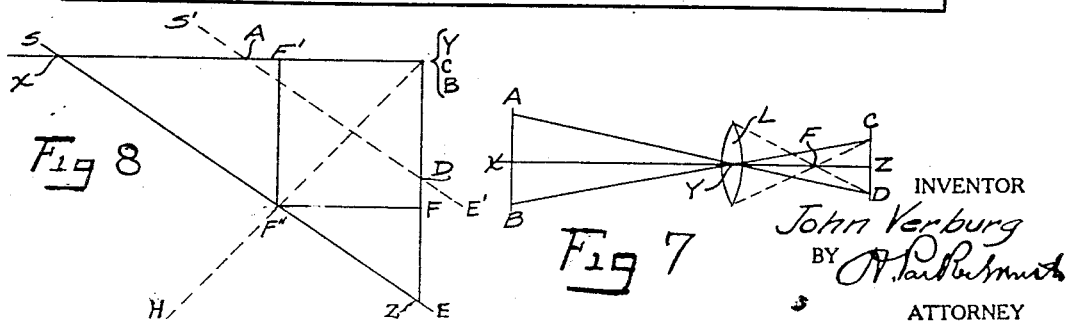
INVENTOR
John Verburg
BY
ATTORNEY Patented Apr. 6, 1926.

1,579,741

UNITED STATES PATENT OFFICE.

JOHN VERBURG, OF JAMAICA JUNCTION, NEW YORK.

AUTOMATIC SCALE FOR COPYING CAMERAS.

Application filed March 23, 1925. Serial No. 17,497.

*To all whom it may concern:*

Be it known that I, JOHN VERBURG, a citizen of the United States of America, residing at Jamaica Junction, county of Queens, State of New York, have invented certain new and useful Improvements in Automatic Scales for Copying Cameras, of which the following is a specification.

My invention relates to the art of making reduced or enlarged photographic copies of any given design, photograph or object, and comprises a simple device for instantly determining the camera adjustments necessary to produce a given result without making the somewhat complicated calculations heretofore required, or hunting them up in a previously computed table. My invention also has the advantage of readily giving the adjustments necessary for any unusual reduction or enlargement ratio which may not be given in the standard tables.

In the adjustment of a camera for making such copies at a given reduced or enlarged size it is necessary to place the lens at a certain distance from the photographic plate or film, which distance is usually called the "bellows adjustment" and then to place the copy at a corresponding particular distance from the lens. The present invention comprises a simple apparatus by which these required distances can be automatically determined in inches, or other linear units, marked on scales thereon, and the work of the photographer thereby be rendered more rapid and accurate. The best form of apparatus at present known to me embodying my invention, together with sundry modifications thereof, are illustrated in the accompanying two sheets of drawings, in which, Fig. 1 is a plan of the preferred form of apparatus.

Fig. 2 is a side elevation thereof.

Fig. 3 is a perspective detail of the adjustable pin, the position of which corresponds to the focal length of the camera lens.

Fig. 4 is a diagram of the camera adjustment.

Figs. 5 and 6 are plan views of modifications, and

Fig. 5ª is a detail cross section on line 5ª—5ª of Fig. 5.

Figs. 7 and 8 are explanatory diagrams.

Throughout the drawings like reference characters indicate like parts.

1 is a block or plate of suitable material (Fig. 1) having a straight, undercut groove 2, near one edge, in which groove slides the block 3 having flaring sides to fit groove 2. On this block a swinging straight edge 4 is pivoted at 5, which straight edge may be clamped in any position on said block by means of clamping screw 7 set in the block and passing through curved groove 6 in said straight edge.

9 is a scale parallel to slot 2, and 10 another scale at right angles to the first mentioned one. The divisions on these may be on any convenient scale, say sixteen to the inch, and are measured and numbered from the vertex 8 of the right angle formed by the scales. 11 and 12 are scales parallel respectively to 9 and 10, the main divisions on which may be on a larger scale for convenience, say four to the inch, and are similarly numbered and measured from the vertex of the right angle formed by 11 and 12.

A second undercut slot 13 bisects the angle formed by scales 9 and 10, and 14 is a block having flaring sides fitting in groove or slot 13 and adjustable in any position therein. 15 is a knife-edged pin set in one end of block 14, and 17 is a screw threaded pin set near the other end and carrying thumb screw 16 and loose washer 18. When thumb screw 16 is turned to the right it is forced down on washer 18 which overlaps the edges of groove 13, the block 14 is wedged up against the undercut edges of the groove and clamped in the position then occupied.

19 is a cross mark on the upper face of block 14 and 20 a scale along the edge of slot 13 cooperating with mark 19. The divisions on scale 20 are so located and numbered that when mark 19 is opposite any one of them the knife-edge of pin 15 will be in a position such that if a line be drawn from it perpendicular to either scale 9 or 10, it will cut the same at a division corresponding in number to that graduation in scale 20 opposite to the mark 19. This means, of course, that the graduation mark on scale 20 opposite mark 19 will indicate the distance from vertex 8 at which the perpendicular 15, 15ª, or 15, 15ᵇ, cuts scale 9 or 10, and also the length of these perpendiculars, to the upper edges of these scales since 15, 15ª, 8, 15ᵇ is a square.

Fig. 4 shows in diagram a camera with a casing 21 at the back 22 of which is placed the photographic plate or film. 23 is the bellows carrying lens 24. The upright 25 represents the copy holder which is adjustable toward and from the camera. XY represents the "copy distance" and YZ the "bellows adjustment" distance, which can be varied by pushing lens and copy holder to right or left hand.

In operation the slide 14 is clamped in position such that the mark 19 is opposite the particular division of scale 20 which is numbered to correspond to the focal length of the lens being used in the camera. In Fig. 1 it is shown opposite division 20ª, the focal length of the lens 24 being assumed at that number of inches. The clamp screw 7 is then loosened and block 3 and straight edge 4 adjusted so that the upper edge of 4 will cross the edge of scale 11 at a point where the reading thereon corresponds to a linear dimension of the copy to be used, and will cross the edge of scale 12 at a point where the reading corresponds to a similar linear dimension of the copy to be made, or "size wanted". This is indicated in full lines. The straight edge is then clamped in this position and the block 3 slid along groove 2 until the straight edge bears against the knife edge of pin 15, as indicated in dotted lines in Fig. 1. The division at which the straight edge then cuts scale 9 will thereupon give the "copy distance" XY, and that one at which the straight edge cuts scale 10 will give the "bellows adjustment" YZ.

The scales 11 and 12 may be used in a reverse manner, the "copy size" being measured on 12 and the "size wanted" on 11, and in that case the readings must also be reversed on scales 9 and 10.

Also one set of scales may be omitted and both sets of readings taken from one. A simplified apparatus of this kind is illustrated in Fig. 5 where the scale measurements are marked along adjacent two sides of the block 31, from a point 32 near one corner in any arbitrary but uniform units subdivided into groups of four for convenience. The straight edge 33 is swiveled at 34 under arm 39 projecting from block 35. The swivel bearing in the straight edge is offset so that the line of the straight edge passes through the pivot center. (See Fig. 5ª.) Block 35 slides in undercut slot 36 which bisects the right angle formed by the scales. The straight edge 33 is clamped in adjusted angular position on said arm 39 by thumb screw 37. The block 35 can be clamped in any position in the slot, if desired, by the clamp screw 39ª similar in arrangement to 16 in Fig. 1, and 39ᵇ are the scale markings along slot 36, which are arranged to cooperate with the rear edge 35ª of block 35, or with any mark thereon corresponding to mark 20ª in Fig. 1.

In operation the straight edge is adjusted in full line position to cut the scales at points having group markings corresponding to "size of copy" and "size wanted" as before. In the drawing it is shown crossing 7 for "copy size" and 4 for "size wanted". The straight edge is clamped by screw 37 in this position and block 35 is then slid along slot 36 until its rear edge 35ª is opposite the division in scale 39ᵇ which corresponds to the focal length of the lens being used. In Fig. 5 it is shown opposite division 24, that being the focal length assumed. The smaller scale divisions then cut by the straight edge will give the "copy distance" and "bellows adjustment" as before. Of course the finer divisions of the scales could be used for adjusting the angularity of straight edge, but usually they are too minute for accurate adjustment of the straight edge, so the larger unit groups of four should be used. All that is necessary is that the straight edge shall be initially adjusted so that the base and perpendicular of the right-angled triangle formed by it with the scales shall have the proportions in length, which "size of copy" bears to "size wanted" when measured in the same unit, whether large or small.

In the further modification shown in Fig. 6, the sliding-block mounting for the straight edge is replaced by a parallel ruler mounting. In this modification 41 may be a drawing board supporting a sheet of paper on which the right-angled scale 46, and focal distance points 47 are marked in ink or pencil. The straight edge 42 is carried by pivoted parallel links 43, 43, from base member 44, which, in turn, is pivoted on thumb screw 45. When this thumb screw is loosened, straight edge 42 may be adjusted to cut the scales at the points marked by the larger divisions representing "size of copy" and "size wanted", as before, (all as shown in full lines). The base 44 is then clamped in the assumed position by turning thumb screw 45, and the straight edge swung back until it passes through the dot in scale 47 representing the focal length of the lens being used, as indicated in dotted lines (a focal length of 20 being assumed). The points at which the straight edge then cuts the scale 46 will give the "copy distance" and "bellows adjustment" as before, the finer divisions again being used for this. In this embodiment of my invention, the particular dot on the scale 47 selected because it is the one located at a distance from the scales corresponding to the focal length of the particular lens used, is, in effect, a stop for the moving straight edge.

In all cases the "copy distance" is always obtained from the scale on which "size of copy" has been measured, or which is parallel to that on which said dimension has been measured, and the "bellows adjustment" is obtained from the scale on which the "size wanted" has been measured, or which is parallel to that on which said last named dimension has been measured.

While a correct understanding of the geometric and optical laws in accordance with which my invention operates is not necessary for its successful use, I may say that, according to my present understanding, I believe the correctness of the readings obtainable from my improved apparatus to result from the embodiment of the following principles therein:

Referring to the diagram Fig. 7 it is generally understood in the art that if a camera lens L has a certain focal length YF and it is desired to reproduce a certain piece of "copy" having a linear dimension AB in a size having a corresponding linear dimension CD, in a given ratio thereto, the distances of copy and photographic plate from the plane of lens L are fixed by the following requirements:

Calling distance YX, the "copy distance" and the distance YZ the "bellows adjustment" (because the lens is usually mounted on a bellows extension of the camera casing to give it adjustability in position), the first requirement is that, $$(1) \quad \frac{YZ}{YX} = \frac{CD \text{ (size wanted)}}{AB \text{ (size of copy)}}$$

The foregoing is true for all thin lenses, and, in the case of a combination of lenses in one camera it is understood that each of these distances is measured from the plane of the outer lens on the nearest side.

Whenever such lens, whether simple or compound, however, has a given fixed or adjusted length of focus, YF, there is a further requirement that also $$(2) \quad \frac{FZ}{FY} = \frac{CD}{AB}$$

Looking at the skeleton diagram of my scale, Fig. 8, it is obvious that if the straight edge SE is so adjusted in a dotted line position SE' that it cuts the sides of the right angle XYZ at points A and D which are at distances from vertex Y respectively the same as the "copy" dimension AB and the "size wanted" dimension CD, and is then slid away from vertex Y, but during such motion of translation held always parallel to its original position, it will always, in any given position XZ cut the sides of the right angle XYZ at points such that, $$\frac{YZ}{YX} = \frac{CD}{AB},$$

because triangles XYZ and AYD are similar triangles.

That is to say, any "bellows adjustment" YZ and "copy distance" YX pair, or set, of relative distances so determined by the sliding straight edge will satisfy equation (1) above given. It remains only therefore to get that "bellows adjustment" and "copy distance" pair or set which will also satisfy equation (2), and this is done by locating a point F'' on the 45 degree line HY such that when perpendiculars F'' F' and F'' F are drawn to sides XY and YZ respectively, of the right angle, distances FY and F'Y will each equal the focal length YF (Fig. 7) and then moving straight edge SE to a position such that it will pass through point F'', as shown in full lines in this diagram, Fig. 8.

The fact that the "copy distance" XY then shown on the scale will bear the same ratio to "bellows adjustment", YZ, as "copy size", AB, bears to "size wanted", CD, is obvious as previously explained. Also, as triangles F'' FZ and AYD are similar, it follows that, $$(3) \quad \frac{FZ}{FF''} = \frac{YD}{YA} = \frac{CD}{AB}$$

Then, since F F''=F Y (F F'' F' Y being a square) it follows that when F Y is substituted for F F'' in equation (3) the desired equation (fulfilling the second requirement)

$$(2) \quad \frac{FZ}{FY} = \frac{CD}{AB}$$

results

That is to say, when the straight edge is moved into full line position SE, such that it passes through point F'', it will cut the sides of the right-angled scale at points X and Z which will read on the scale in inches a "copy distance" (XY) and a "bellows adjustment" ZY which, with a lens having a focal length FY, will reproduce the "copy" AB, in the "size wanted", CD.

Perhaps still other forms of apparatus than those here shown could be developed which would operate on the principle of my invention as above explained and still be within the scope thereof. The essential elements of those shown are: a right-angled scale or set of parallel scales, an angularly adjustable straight edge, means for moving said straight edge over said scale or scales without varying its initially adjusted angularity thereto, and means so locating said movable straight edge that it shall go through a point on the line bisecting the right angle which is distant from the vertex of said angle a distance equal to the diagonal of a square having the lens focal length for its sides, or, to state this requirement in another way, the fixed point on the bisector of the right angle must be at a distance from the sides of the angle equal to the focal length of the lens being used.

Having described my invention, I claim:

1. An apparatus for determining the adjustments required for producing with a given camera copies of given sizes which comprises, in combination, two similar rectilinear scales having a common zero point at the vertex of a right angle formed by them, a straight edge angularly adjustable with reference to said scales, a device permitting said straight edge to move over said scales without varying its angle of inclination thereto after adjustment, and means for determining that position of said movable straight edge at which it will cross a line bisecting the angle formed by said scales at a point removed from each of said scales by a distance corresponding with the focal length of the camera lens.

2. A combination such as set forth in claim 1 in which said means for determining the position of said movable straight edge comprises a pin mounted on a sliding block and a guide for said block extending along said bisecting line.

3. An apparatus for determining the adjustments required for producing with a given camera copies of given sizes which comprises, in combination, two similar rectilinear scales having a common zero point at the vertex of a right angle formed by them, a straight edge angularly adjustable with reference to said scales, a device permitting said straight edge to move over said scales without varying its angle of inclination thereto, and means for so adjusting the position of said straight edge without varying its inclination that it will touch a point on the bisector of said angle located at a distance from the sides thereof equal to the focal length of the camera lens, said means comprising an adjustable pin adapted to be placed at the said point which indicates the focal length of the lens.

JOHN VERBURG.